Jan. 11, 1949. W. J. BRYANT ET AL 2,458,765
PLANETARY GRINDING MACHINE
Filed Jan. 10, 1945
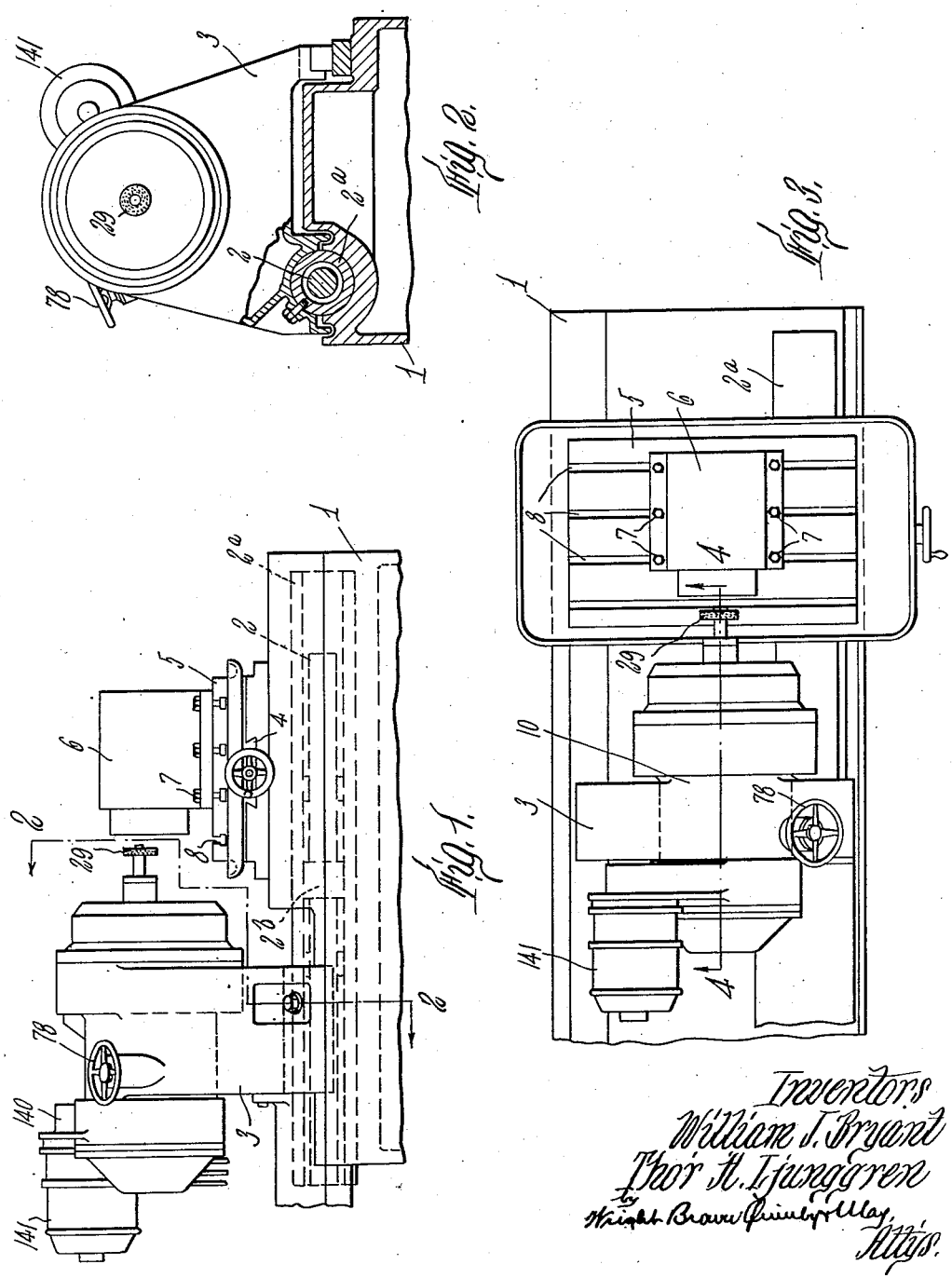

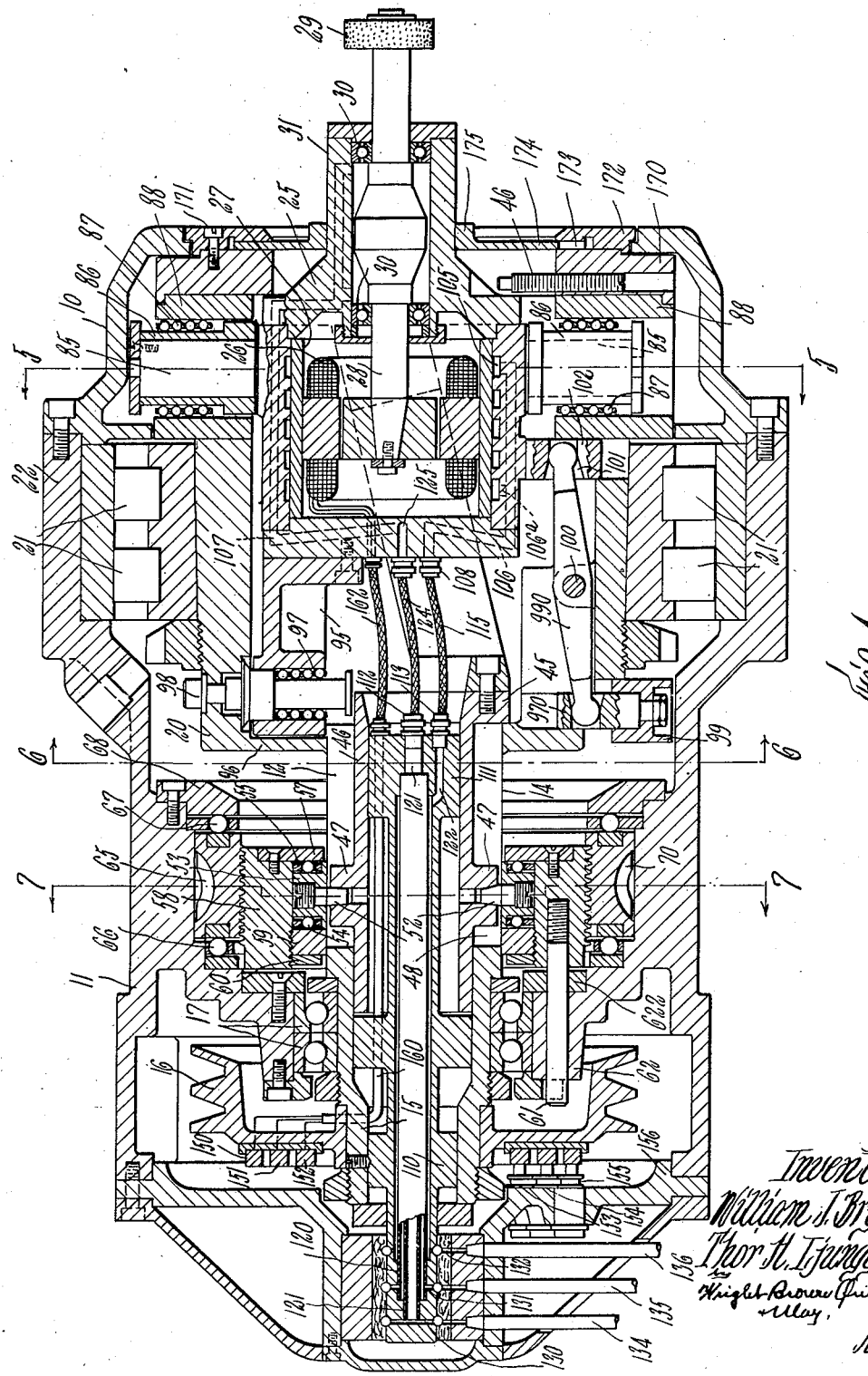

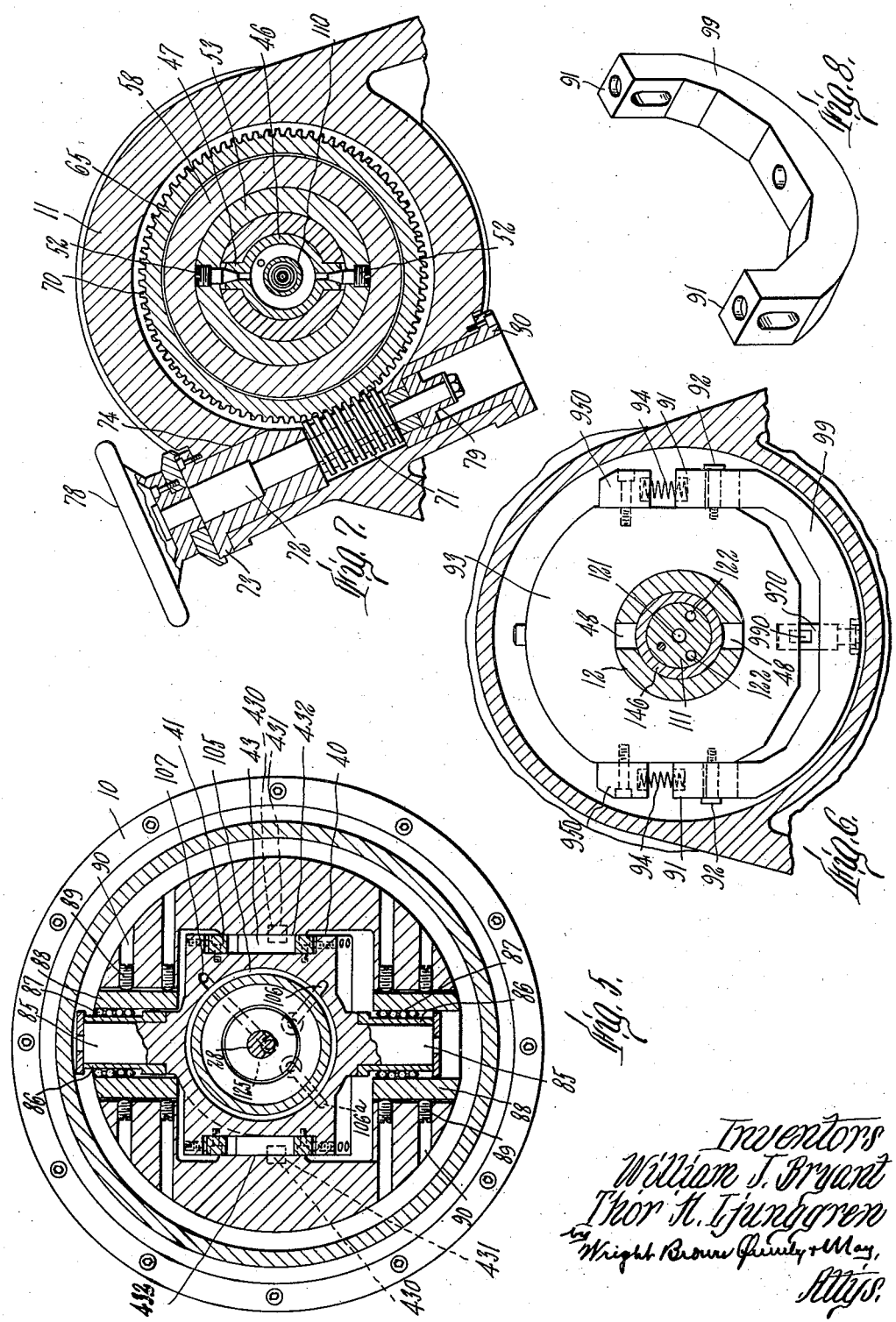

Jan. 11, 1949. W. J. BRYANT ET AL 2,458,765
PLANETARY GRINDING MACHINE
Filed Jan. 10, 1945
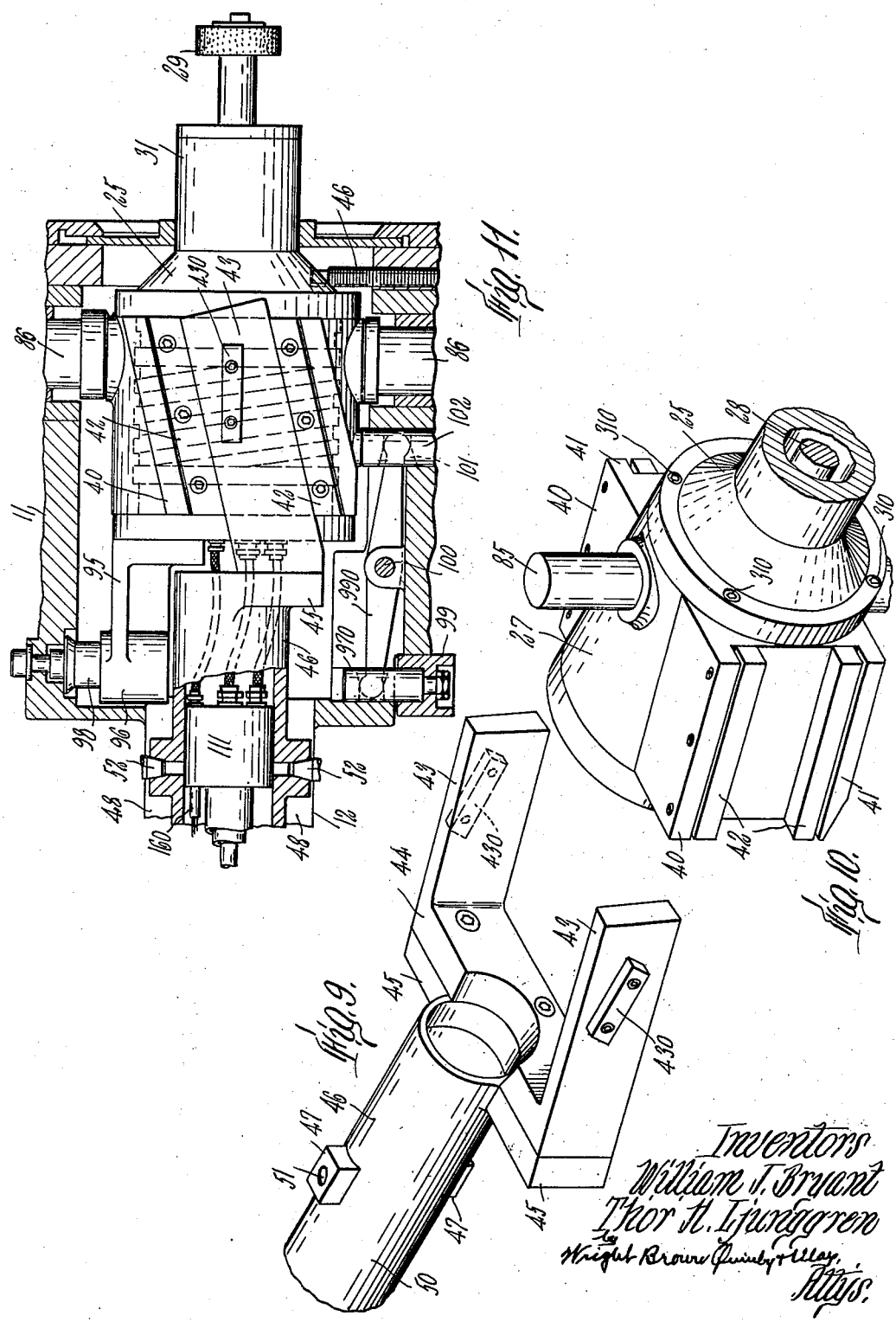

Patented Jan. 11, 1949

2,458,765

UNITED STATES PATENT OFFICE 2,458,765

PLANETARY GRINDING MACHINE

William J. Bryant, Springfield, Vt., and Thor H. Ljunggren, Charlestown, N. H., assignors to Bryant Chucking Grinder Company, Springfield, Vt., a corporation of Vermont Application January 10, 1945, Serial No. 572,140

12 Claims. (Cl. 51—43)

This invention relates to grinding circular or cylindrical surfaces, and particularly to the grinding of holes in work where it is not convenient to rotate the work. In accordance with this invention, therefore, the work is held stationary and the grinding wheel while rotating about its own axis is caused to describe a circular orbital path so that the grinding engagement between the wheel and work follows in a circular or cylindrical path at the same time that the wheel and work may be relatively traversed in the direction of the axis of the grinding path.

A further object is to provide means by which the radius of gyration of the wheel may be varied so as to determine the diameter of the hole being ground and to feed the grinding wheel toward or retract it from the work surface as may be desired.

A further object is to eliminate the necessity of extending the grinding wheel spindle entirely through the master shaft of the grinding head in the axis of the orbital path of the grinding wheel, which is necessary when the grinding wheel spindle is belt driven. Such a belt-driven spindle also requires multiple bearings which unduly limit the speed of spindle rotation.

Still another object is to provide in a grinding machine of this type a construction by which interchange of wheel spindles may be readily effected without hazard to bearing adjustment and alinement.

A further object is to provide an improved rectilinear adjustment of eccentricity of the grinding wheel spindle relative to the master shaft. This permits an exactly proportional eccentricity adjustment for motion of the controlling member and may be made to operate without undue looseness or backlash. It likewise affords a simple and exact means to adjust the wheel spindle into coaxial relation to the master shaft, which is of advantage in connection with properly locating the work with the axis of the part to be ground coaxial with the master shaft, for truing the grinding wheel, and for other purposes.

Still another object is to provide means for counterbalancing the grinding wheel unit in accordance with its variable radius of gyration and to provide for this counterbalancing in such a manner that unbalance of the system in periods of acceleration and deceleration is avoided.

Further objects of the invention are to provide a direct connected motor for the grinding wheel with means for forced cooling and lubrication of the grinding unit.

Other objects and advantages will appear from a description of an embodiment of the invention shown in the accompanying drawings in which Figure 1 is a fragmentary front elevation of an internal grinding machine embodying the invention.

Figure 2 is a fragmentary cross sectional view on line 2—2 of Figure 1.

Figure 3 is a top plan view of the parts shown in Figure 1.

Figure 4 is a vertical sectional view to a larger scale through the grinding wheel head on line 4—4 of Figure 3.

Figures 5, 6 and 7 are sectional views on the correspondingly numbered section lines of Figure 4.

Figure 8 is a perspective view of a counterbalance weight.

Figures 9 and 10 are isometric views of parts cooperating to adjust the amplitude of gyration of the grinding wheel.

Figure 11 is a fragmentary view showing the parts of Figures 9 and 10 assembled and with the parts in different positions of adjustment from Figure 4.

Referring to Figures 1, 2 and 3, at 1 is indicated a grinding machine bed. Along one side of this bed is mounted a shaft 2 about the axis of which is rockably and axially movable a tube 2a forming a portion of a longitudinally movable carriage 3. The tube 2a may constitute a hydraulic cylinder for a piston 2b secured to the shaft 2 for moving the carriage 3. This bed 1 supports in lateral ways 4 a work carriage 5 to which work 6 may be secured as by bolts 7 having their heads arranged in T slots 8 in the top face of the work carriage. Any suitable means may be provided for feeding the work carriage 5 laterally and for moving the carriage 3 longitudinally. This general mounting of the carriage 5 may be substantially as shown in the Arms Patent No. 2,310,338 granted February 9, 1943, for Metal working machine. The grinding wheel is supported on the carriage 3 in a wheel head 10. This wheel head comprises a casing 11 within which is journaled a master shaft 12. As shown best in Figure 4, the master shaft 12 has a reduced diameter portion 14 which has a further reduced extremity 15 to which is secured a belt pulley 16 shown as of the multiple V type. To the right of the pulley 16 and projecting thereinto are the supporting bearings 17 for the shaft 12. The shaft 12 also has an enlarged diameter portion 20 which is journaled in roller bearings 21 in an enlarged diameter portion 22 of the wheel head casing. This enlarged diameter portion 20 of the master shaft is hollow and forms an enclosure within which is mounted a motor 25 having a stator 26 rigidly carried by the motor casing 27 and a rotor spindle 28 having a grinding wheel 29 on its outer end beyond the end of the master shaft 12. This rotor spindle 28 is journaled in spaced bearings 30 in an extension 31 of the motor casing 27. This extension 31 together with the spindle 28, its bearings, and the motor armature may be removed and replaced as a unit without disturbing the master shaft and its mounting or that of the stator 26, being shown as secured to the stator by screws 310 (Figure 10). The motor casing 27 is of considerably smaller external diameter than the chamber within the enlarged portion 20 of the master shaft and is adjustable laterally of its axis and the axis of the master shaft in such a manner that it may be brought into coaxial relation with the master shaft, if desired, and adjusted transverse to these axes out of such coaxial relation to cause the motor rotor to gyrate about the axis of the master shaft while it is being rotated about its own axis.

As best shown in Figures 10 and 11, the motor casing 27 is provided with a pair of ways 40 inclined to the axis of the motor and on opposite sides thereof. These ways 40 are shown as of channel cross section having spaced outwardly extending flanges 41. Against the inner faces of these flanges are adjustably secured shoes 42 which are arranged in pairs and between the shoes of each pair rides the side member 43 of a yoke 44, the side members 43 being inclined in the same direction to the axis of the motor as are the ways 40. The yoke side members 43 are further guided by keys 430 secured thereto and riding in key slots 431 (Figure 5) in opposed walls 432 of the shaft portion 20. Thus, as the yoke 44 is moved axially of the master shaft from the position shown in Figure 4 to that shown in Figure 11, the motor casing is moved laterally of the master shaft axis from a position non-coaxial therewith shown in Figure 4 to the coaxial relation shown in Figure 11. A stop screw 46 threaded through a front cover 170 partly closing the enlarged portion 20 of the master shaft 12 may be employed to prevent adjustment of the motor in one direction beyond coaxial relation to the master shaft. The yoke 44 is attached to laterally extending wings 45 at the forward end of a sleeve 46 which has a pair of diametrically opposite lugs 47 which ride in a slot 48 through the master shaft portion 12. Rearwardly of the lugs 47 the tubular portion 50 of the shank 46 rides within the master shaft portion 12 beyond the left hand ends of the slots 48. The lugs 47 are provided with conical sockets 51 within which are engaged the tapered extremities of a pair of plugs 52 having outer portions threaded into a ring 53 which surrounds the portion 12 of the master shaft and is journaled between a pair of opposed thrust ball bearings 54 and 55. The ball bearing 55 is held between the ring 53 and a clamping disk 57 secured to an externally threaded collar 58. The ball bearing 54 is held in position against the opposite face of the ring 53 by a ring 59 threaded into collar 58 and held in position as by a lock nut 60. Thus axial movement of the collar 58 will be transmitted through the ring 53 and the plugs 52 to the sleeve 46 and while the ring 53 rotates with the sleeve 46 and the master shaft, the collar 58 may be held from turning. It is so held from turning by being keyed to the casing 11, and for this purpose a pin 61 is shown as threaded into the rear end of the collar 58 and is slidably guided through a boss 62 forming a portion of the master shaft casing 11.

Axial motion of the threaded collar 58 may be produced by rotation of a nut element 65 threaded thereon and journaled between thrust ball bearings 66 and 67, the stationary raceways of which bear against the portion 622 of the casing 11 and a ring 68 secured thereto. The nut 65 may be turned in order to adjust the threaded collar 58 axially and for this purpose it is shown as provided with worm wheel teeth 70 (see Figure 7) with which meshes a worm 71 carried by a shaft 72. This shaft 72 is journaled in a bushing 73 which may be secured in an opening 74 extending through the casing 11. To the upper end of the shaft 72 may be fixed a hand wheel 78 by which it may be turned. The lower end of the shaft 72 is secured to a thrust collar 79 seated in a bushing 80 also extending into the opening 74. The motor casing is guided within the master shaft in order to maintain its rotor axis in parallel relation to the master shaft axis. To this end, the motor casing is provided with cylindrical oppositely disposed guide plungers 85 which are provided with bushings 86 carrying ball bearings 87 within cartridges 88. The cartridges 88 may be adjusted angularly so as to accurately position the motor by turning plugs 89 threaded into sockets 90 of the master shaft (see Figure 5). The motor casing is also provided with a rearwardly extending bracket 95 (see Figures 4 and 11) provided with a perforated boss 96 within which is slidably guided within the ball bearings 97 a stud 98 secured to the master shaft portion 20. Thus a three-position bearing for the motor casing is provided, each of the positions having ball bearings which, if desired, may be pre-loaded for extreme accuracy of control. These hold the motor with its rotor or spindle axis parallel to or coaxial with the master shaft.

In order to counterbalance the weight of the motor and the parts carried thereby, a counterbalance 99 (shown detached in Figure 8) may be employed. This counterbalance is provided with spaced arms 91 having pin and slot connections at 92 to opposite sides of a web portion 93 of the master shaft and take-up springs 94 are interposed between opposite ends of the counterbalance and abutment blocks 950 secured to the web portion 93 pressing said counter weight away from the master shaft axis. The mid-portion of the counterbalance 99 has secured therein a post 970 slotted for the reception of one end of a lever 990 fulcrumed at 100 to the master shaft 12 and having its opposite end guided within a slot 101 in a lug 102 extending from the motor casing (Figures 4 and 11). Thus as the motor casing is moved laterally in one direction, the counterbalance is moved an equal distance in the opposite direction. The take-up springs 94 and centrifugal action hold the coacting parts under tension in all positions and prevent unbalance of the system during periods of acceleration and deceleration.

The motor is preferably of the high frequency high speed type and is provided with a spiral passage 105 around its stator for the passage of a cooling liquid. From opposite end portions of this passage there may extend passages 106 and 106a leading to nipples 108. Within the sleeve 46 there may extend a tubular guide 110 having a head 111 at its inner end provided with nipples 113 which may be connected by flexible pipes 115 with the nipples 108. Within the tubular member 110 are a series of concentric pipes 120 and 121 which define between them and the interior of the tube 110 three passages, the outer two of which communicate through passages 122 with the nipples 113. The central pipe 121 communicates through a flexible conduit 124 with a passage 125 leading through the stator casing to the space between the bearings 30. The various passages between the concentric pipes communicate through lateral passages 130, 131 and 132 into peripheral grooves of a manifold within which the rear end of the tubular member 110 is journaled and from these manifolds extend pipes 134, 135 and 136. Through the pipe 134 leading to the inner of these passages may be forced lubricant into the space between the ball bearings 30, while the pipes 135 and 136 furnish means by which cooling liquid may be introduced into and withdrawn from the cooling passages of the motor stator.

The casing 11 may be provided with a lateral extension 140 to house a V belt leading from the belt pulley 16 to the rotor of a driving motor, the casing of which at 141 may be secured to or integral with the casing 11.

The electrical connections to the tool spindle motor may be produced through three slip rings 150, 151 and 152 which are shown as placed on the outer face of the belt pulley 16 and upon which ride suitable brushes on terminals 153, 154 and 155 carried by the stationary end plate 156 of the casing 11. These slip rings may be connected through a suitable conduit 160 and a flexible cable 162 with the wire conections for the motor. It will thus be seen that the motor rotor may be rotated about its own axis which is the axis of the grinding wheel, and that the entire motor may be given a gyratory motion in a circular path thus to cause the grinding wheel to describe a circular path. The traverse motion between the grinding wheel and the work may be produced by moving the work supporting carriage parallel to the grinding wheel spindle axis and feed and retraction between the work and wheel may be produced by changing the amplitude of gyration of the grinding wheel by turning the hand wheel 78. This amplitude also determines, with any given diameter of grinding wheel, the diameter of the work surface being ground.

The cover 170 is secured to the end of the enlarged portion 20 of master shaft 12 by any conventional means. On this cover 170 is mounted a plate 172 by means of screws 171. This plate 172 and cover 170 forms between them an annular recess 173 in which the disk 174 can freely slide in radial direction thus forming a sealing device to prevent grit, coolant, etc. from entering the hollow of the master shaft containing sensitive mechanism. The disk 174 has an enlarged hub portion 175 snugly fitted over extension 31.

By positioning the motor housing as shown in Figure 11 or with the motor and grinding spindle coaxial with the master shaft and by unscrewing screws 171, the plate 172 can be removed. Disk 174 may now be taken off the extension 31 and by removing the screws 310, the grinder spindle and bearing assembly can be removed and exchanged.

From the foregoing description of an embodiment of this invention, it should be evident to those skilled in the art that various changes and modifications might be made without departing from the spirit or scope of this invention.

We claim:

1. In combination, a casing, a hollow rotary master shaft journaled in said casing, a motor supported within said master shaft and having a rotor with its axis parallel to the axis of said master shaft, means for adjusting said motor transverse to said axis to adjust said rotor axis toward and from coaxial relation to said master shaft axis, a tool carried by said rotor beyond one end of said master shaft, means for rotating said master shaft, electrical connections through said master shaft to said motor, a counterbalance for said motor and related parts movably carried by said master shaft, connections between said motor and counterbalance causing the adjustment of said motor transverse to said axis to adjust said counterbalance in the opposite direction, and means for taking up backlash in said connections.

2. In combination, a casing, a hollow rotary master shaft journaled in said casing, a motor supported within said master shaft and having a rotor with its axis parallel to the axis of said master shaft, means for adjusting said motor transverse to said axis to adjust said rotor axis toward and from coaxial relation to said master shaft axis, a tool carried by said rotor beyond one end of said master shaft, means for rotating said master shaft, electrical connections through said master shaft to said motor, a counterbalance for said motor and related parts movably carried by said master shaft, a lever pivoted to said master shaft, and connections between opposite ends of said lever to said motor and counterbalance causing the adjustment of said motor transverse to said axis to adjust said counterbalance in the opposite direction.

3. In combination, a casing, a hollow rotary master shaft journaled in said casing, a motor supported within said master shaft and having a rotor with its axis parallel to the axis of said master shaft, means for adjusting said motor transverse to said axis to adjust said rotor axis toward and from coaxial relation to said master shaft axis, a tool carried by said rotor beyond one end of said master shaft, means for rotating said master shaft, electrical connections through said master shaft to said motor, a counterbalance for said motor and related parts movably carried by said master shaft, a lever pivoted to said master shaft, connections between opposite ends of said lever to said motor and counterbalance causing the adjustment of said motor transverse to said axis to adjust said counterbalance in the opposite direction, and spring means pressing said counterbalance outwardly from said master shaft axis.

4. In combination, a casing, a hollow rotary master shaft journaled in said casing, a motor supported within said master shaft and having a rotor with its axis parallel to the axis of said master shaft, means for adjusting said motor transverse to said axis to adjust said rotor axis toward and from coaxial relation to said master shaft axis, a tool carried by said rotor beyond one end of said master shaft, means for rotating said master shaft, electrical connections through said master shaft to said motor, and a stop carried by said master shaft in position to limit the adjustment of said motor in one direction to such coaxial relation.

5. In combination, a casing, a hollow rotary master shaft journaled in said casing, a motor supported within said casing and having a rotor with its axis parallel to the axis of said master shaft, said motor having a casing provided with elements inclined to said axis, a slide supported within said master shaft for motion in the direction of said axis and having elements cooperating with said motor casing elements to cause motion of said slide to move said motor transverse to said axis to adjust the axis of said motor from and toward the coaxial relation to said master shaft, a tool carried by said rotor beyond one end of said master shaft, means for rotating said master shaft, electrical connections through said master shaft to said motor, a sleeve coaxial with said master shaft and within which said master shaft is journaled, operative connections from said sleeve to said slide to cause axial motion of said sleeve to move said slide, said sleeve being externally threaded, a nut threaded on said sleeve, means supporting said nut against axial motion, and means for turning said nut to thereby move said slide and adjust said motor and tool laterally with respect to the axis of said master shaft.

6. In combination, a casing, a hollow rotary master shaft journaled in said casing, a motor mounted in said master shaft for adjustment laterally of the axis of said master shaft and having a rotor movable by such adjustment toward and from coaxial relation with said master shaft, said motor having a stator provided with a liquid cooling passage therethrough, said master shaft having a part coaxial therewith provided with liquid passages, flexible connections between said part passages and said stator passage, and a stationary manifold within which said part is journaled having annular ports in constant communication with said part passages, and means for supplying to and withdrawing cooling liquid from said ports.

7. In combination, a casing, a hollow rotary master shaft journaled in said casing, a motor mounted in said master shaft for adjustment laterally of the axis of said master shaft and having a rotor movable by such adjustment toward and from coaxial relation with said master shaft, said motor having a rotor and bearings for said rotor, said master shaft having a part provided with a lubricant passage therethrough, a flexible conduit connecting said passage to said bearings, a journal for said part having an annular port with which said passage connects, and means for supplying lubricant to said port.

8. In combination, a casing, a rotary master shaft journaled in said casing, means for rotating said master shaft, a motor stator supported for rotation with said master shaft and for adjustment from and toward coaxial relation to said master shaft and when out of such coaxial relation with its axis parallel to the axis of said master shaft, means for so adjusting said stator, and a unit comprising a tool spindle having a motor rotor at one end and an intermediate spindle bearing removably secured to said motor stator with the rotor in cooperative relation to said stator, and said tool spindle projecting beyond one end of said motor shaft.

9. In combination, a casing, a rotary master shaft journaled in said casing, means for rotating said master shaft, a motor supported within said casing and having a rotor with its axis parallel to the axis of said master shaft, a slide inclined to the axis of said master shaft and carried by said shaft for motion parallel to said axes, said motor having a part engaging said slide to cause the axial motion of said slide to move said motor transverse to said axes into and out of coaxial relation to said master shaft, means for adjusting said slide axially, and a tool carried by said rotor beyond one end of said master shaft.

10. In combination, a casing, a rotary master shaft journaled in said casing, means for rotating said master shaft, a motor supported within said casing and having a rotor with its axis parallel to the axis of said master shaft, a slide inclined to the axis of said master shaft and carried by said shaft for motion parallel to said axes, said motor having a part engaging said slide to cause the axial motion of said slide to move said motor transverse to said axes into and out of coaxial relation to said master shaft, an internally threaded ring journaled in said casing, an externally threaded element in threaded engagement with said ring within said casing and mounted for axial and nonrotative motion relative thereto, and operative connections from said element to said slide whereby rotation of said ring moves said slide axially, means actuable from without said casing for turning said ring, and a tool carried by said rotor beyond one end of said master shaft.

11. In combination, a casing, a hollow rotary master shaft journaled in said casing, a motor within the hollow of said shaft and having a casing and a rotor within said motor casing, said rotor having its axis parallel to the axis of said master shaft, a slide movable axially of and within said master shaft and provided with a yoke inclined to said axis, said motor casing having ways inclined to said axis for receiving said yoke, whereby axial motion of said slide moves said motor casing laterally toward or away from coaxial relation to said master shaft, a tool carried by said rotor beyond one end of said master shaft, means for rotating said master shaft, means for adjusting said slide axially, and electrical connections through said master shaft to said motor.

12. In combination, a casing, a hollow rotary master shaft journaled in said casing, a motor within the hollow of said shaft and having a casing and a rotor within said motor casing, said rotor having its axis parallel to the axis of said master shaft, a slide movable axially of and within said master shaft and provided with a yoke inclined to said axis, said motor casing having ways inclined to said axis for receiving said yoke, whereby axial motion of said slide moves said motor casing laterally toward or away from coaxial relation to said master shaft, a tool carried by said rotor beyond one end of said master shaft, means for rotating said master shaft, means for adjusting said slide axially, and electrical connections through said master shaft to said motor, said yoke and master shaft having guide means restricting said yoke to motion lengthwise of said axis.

WILLIAM J. BRYANT.
THOR H. LJUNGGREN.

REFERENCES CITED

The following references are of record in the file of this patent:

UNITED STATES PATENTS

| Number | Name | Date |
|---|---|---|
| 1,996,842 | Stevens | Apr. 9, 1935 |